(12) United States Patent
Niccolai et al.

(10) Patent No.: US 10,285,406 B2
(45) Date of Patent: May 14, 2019

(54) AUTOMATIC CUTTING APPARATUS, APPLICABLE TO PRESSES FOR MAKING PASTA OR TO EXTRUDERS FOR MAKING SNACKS

(71) Applicant: NICCOLAI TRAFILE S.R.L., Pistoia (IT)

(72) Inventors: Marcello Niccolai, Pistoia (IT); Marco Niccolai, Pistoia (IT)

(73) Assignee: NICCOLAI TRAFILE S.R.L., Pistoia (IT)

(*) Notice: Subject to any disclaimer, the term of this patent is extended or adjusted under 35 U.S.C. 154(b) by 406 days.

(21) Appl. No.: 15/171,217

(22) Filed: Jun. 2, 2016

(65) Prior Publication Data

US 2016/0353751 A1    Dec. 8, 2016

(30) Foreign Application Priority Data

Jun. 3, 2015   (IT) .................. 102015000019799

(51) Int. Cl.
| | | |
|---|---|---|
| *A21C 11/22* | (2006.01) |
| *B26D 1/26* | (2006.01) |
| *B26D 5/08* | (2006.01) |
| *B26D 7/32* | (2006.01) |
| *A21C 11/10* | (2006.01) |
| *A21C 11/16* | (2006.01) |
| *B26D 7/00* | (2006.01) |

(52) U.S. Cl.
CPC .............. *A21C 11/22* (2013.01); *A21C 11/10* (2013.01); *A21C 11/16* (2013.01); *B26D 1/26* (2013.01); *B26D 5/086* (2013.01); *B26D 7/32* (2013.01); *B26D 2007/0018* (2013.01); *B26D 2210/02* (2013.01)

(58) Field of Classification Search
CPC .......... A21C 11/10; A21C 11/16; A21C 11/22
See application file for complete search history.

(56) References Cited

U.S. PATENT DOCUMENTS

2008/0193618 A1* 8/2008 Guinard ................. A21C 11/10
426/503

OTHER PUBLICATIONS

Italpast, Pressa MAC 300 VR Brochure (Year: 2008).*

* cited by examiner

*Primary Examiner* — Timothy Kennedy
(74) *Attorney, Agent, or Firm* — Cantor Colburn LLP (57) ABSTRACT

An automatic cutting apparatus, applicable to presses for making pasta or to extruders for making snacks includes a main supporting structure, an annular support having a vertical axis, a main shaft arranged coaxially to the annular support, and elements for actuating the main shaft with a rotary motion about its own axis. The annular support can be associated with a press for making pasta or an extruder for making snacks below a die that has a vertical axis and is connected to the outlet of the press or of the extruder, or below a cutting accessory that is interposed between the die and annular support. The main shaft can be coupled to at least one blade that is adapted to act on the lower die face or with at least one blade of the cutting accessory.

15 Claims, 6 Drawing Sheets

AUTOMATIC CUTTING APPARATUS, APPLICABLE TO PRESSES FOR MAKING PASTA OR TO EXTRUDERS FOR MAKING SNACKS

CROSS-REFERENCE TO RELATED APPLICATIONS

This application claims priority to Italian Patent Application Number 102015000019799 (UB2015A001056), filed on Jun. 3, 2015. The content of said application is herein incorporated by reference in its entirety.

TECHNICAL FIELD

The present disclosure relates to an automatic cutting apparatus, applicable to presses for making pasta or to extruders for making snacks.

BACKGROUND

As is known, many of the commercially available formats of pasta are obtained by extrusion, i.e., by forcing a mix, usually based on water and flour, to pass through passages defined in a tool, known indeed as die or extrusion die. At the output of these passages there is at least one blade with one or more cutting elements that cuts the pasta as it exits from the die.

More particularly, the die usually has a substantially disk-like shape and is arranged so that its axis is vertical. The die is crossed, from its upper face to its lower face, by a plurality of passages, the transverse sectional shape of which varies from die to die depending on the shape of the pasta to be made.

In pasta making plants, the die is arranged in an adapted receptacle at the output of a press that pushes the mix against the upper face of the die, forcing it to pass through the passages of the die.

On the lower face of the die usually there is at least one blade that can be actuated with a continuous or intermittent rotary motion about the axis of the die so as to affect progressively the strands of pasta that exit below the die in order to cut them with a length that is a function of the frequency with which the blade rotates and of the speed with which the pasta is extruded from the die.

Below the die usually there is a chute that collects the cut pasta and conveys it into a container or under onto an underlying conveyor.

The blade and the chute are part of a cutting apparatus that is arranged below the die to be served.

When cutting of the pieces of pasta along an inclined plane is required, such as for example in the case of the pasta format known as "penne", the cutting apparatus is equipped with an accessory known as "cutting cone", which can be associated with the lower face of the die and has a plurality of passages, each of which can be arranged in alignment with a passage of the die. The outlets of the passages of the cutting cone are arranged on a conical surface, the axis of which coincides with the axis of the die. At least one blade is actuated on this conical surface, rotates about the axis of the conical surface and in this manner cuts the strands of pasta that exit from these outlets along inclined planes.

In this accessory, the blade is mounted on the cutting cone and is actuated by means of a mechanical transmission that belongs to the cutting apparatus and is the same transmission that actuates the blade or blades that act on the lower face of the die in the absence of the cutting cone.

As an alternative to the cutting cone, other cutting accessories can be mounted for the production of particular pasta formats, such as for example the accessory known as straight cutter.

Usually, a pasta production line is provided so as to be able to produce various formats of pasta after replacing the die and the cutting accessory, if any, mounted on the cutting apparatus that serves it.

Die replacement is usually automated, while replacement or simple mounting of the cutting accessory in cutting apparatuses of the known type, are performed by means of almost entirely manual operations.

These operations require a stop of the pasta production line that affects significantly the productivity of the line.

A similar problem can be observed in plants for the production of snacks that use dies and cutting apparatuses similar to the ones described above.

SUMMARY

The aim of the present disclosure is to solve the problem described above, by providing an automatic cutting apparatus applicable to presses for making pasta or to extruders for making snacks that allows to reduce significantly the time required for mounting or replacement of the cutting accessories that can be mounted on the apparatus.

Within this aim, the disclosure provides an apparatus in which the mounting of a cutting accessory can be performed in a fully automated manner.

The disclosure further provides an apparatus in which the actuation of the blade or blades can be controlled constantly so as to avoid malfunctions or damage of the machine in the presence of operating anomalies.

The disclosure also provides an apparatus that ensures high reliability in operation.

The disclosure provides an apparatus that is structurally simple and can be manufactured with competitive costs.

Thus, the disclosure provides an automatic cutting apparatus, applicable to presses for making pasta or to extruders for making snacks, comprising:
  a main supporting structure;
  an annular support having a vertical axis, which can be associated with a press for making pasta or with an extruder for making snacks below a die that has a vertical axis and is connected to the outlet of the press or of the extruder, or below a cutting accessory that is interposed between the die and said annular support;
  a main shaft that is arranged coaxially to said annular support and can be coupled to at least one blade that is adapted to act on the lower face of the die or with at least one blade of said cutting accessory;
  means for actuating said main shaft with a rotary motion about its own axis;
  said actuation means comprising an electric motor;
characterized in that said actuation means comprise:
  a control and actuation element of the electronic type;
  means for detecting the operating torque of said electric motor, which are functionally connected to said control and actuation element for the actuation at least of said electric motor as a function of the operating torque detected by said detector means.

BRIEF DESCRIPTION OF THE DRAWINGS

Further characteristics and advantages of the disclosure will become better apparent from the description of a preferred but not exclusive embodiment of the apparatus according to the disclosure, illustrated by way of nonlimiting example in the accompanying drawings, wherein.

DETAILED DESCRIPTION OF THE DRAWINGS

With reference to the figures, the apparatus according to the disclosure, designated generally by the reference numeral 1, comprises a main supporting structure 2 that supports an annular support 3, which is arranged so that its axis 4 is vertical and is associable with a press 5 for making pasta, as shown in the accompanying figures, or with an extruder of a known type for making snacks, below a die 6 that has a vertical axis and is connected to the outlet of the press 5 or of the extruder.

The annular support 3 can be arranged directly below the die 6 or can be arranged below a cutting accessory 7, supported by said annular support 3, which is interposed between the die 6 and the annular support 3, as will become better apparent hereinafter.

The annular support 3 supports a main shaft 8 that is arranged coaxially to the annular support 3 and can be coupled to at least one blade 9 which is adapted to act on the lower face of the die 6 or can be coupled to at least one blade 10 supported by the cutting accessory 7. In the illustrated embodiment there is a single blade 9, 10, with a single cutting edge, supported directly by the main shaft 8 or supported by the cutting accessory 7. For the sake of simplicity in description, reference shall be made hereinafter to a single blade, it being understood that a plurality of blades, each provided with one or more cutting elements, may be provided.

The apparatus according to the disclosure is provided with means 11 for actuating the main shaft 8 with a rotary motion about its own axis 4, so as to actuate the blade 9, 10 cited above about its own axis, which also coincides with the axis 4 of the annular support 3, and said actuation means 11 comprise an electric motor 12.

According to the disclosure, these actuation means 11 also comprise: a control and actuation element 13 of the electronic type and means for detecting the operating torque of the electric motor, which are functionally connected to the control and actuation element 13 so that it controls the actuation at least of the electric motor 12 as a function of the operating torque that is detected by the detector means.

Conveniently, the control and actuation element 13 is adapted to interrupt and/or vary the actuation of the electric motor 12 that actuates the main shaft 8 upon reaching an operating torque that is preset in the control and actuation element 13.

Preferably, the electric motor 12, which actuates the main shaft 8, is constituted by a brushless electric motor and the torque detection means can be integrated in a per se known matter in the motor.

In greater detail, the die 6 can be constituted by a die of a known type that has a substantially disk-like shape and is crossed axially by a plurality of extrusion passages 14, which are referenced hereinafter as die holes for the sake of simplicity and the transverse sectional shape of which corresponds to the shape of the format of pasta 15 to be produced. The die 6 is arranged inside a receptacle 16 that is provided for this purpose in the head of the press 5. The die 6 is arranged in the receptacle 16 so that its axis is oriented vertically, so as to be substantially horizontal.

The die 6 is supported by the head of the press 5 detachably, so that it can be removed if needed.

The die 6, arranged in the receptacle 16, is connected, by means of its upper face, to the outlet of the press 5, which can be for example of the screw or hydraulic type, of a known kind and not shown for the sake of simplicity, which propels the mix to be extruded against the upper face of the die 6.

Optionally, laterally to the die 6 there can be, in two mutually diametrically opposite regions, two storage compartments 17, 18, respectively: a first empty storage compartment 17 and a second storage compartment 18 that accommodates another die 6 that can be used as a replacement of the die 6 in use, which can be translated in the first storage compartment 17 when a change of the format of pasta 15 to be produced is required.

A chute 20 for the collection and unloading of the extruded pasta 15 is connected to the lower side of the annular support 3. The chute 20 can be orientable, in a per se known manner, to allow the unloading of the extruded pasta 15 into a collection container or conveyor of the pasta to be dried and packaged or into a container for collecting the pasta to be discarded, for example for pasta extruded during startup or setup of the production plant.

The annular support 3 is supported by the end of an arm 21, which is arranged substantially horizontally and is supported by the main supporting structure 2.

The arm 21 is connected, with its end that lies opposite with respect to the end that supports the annular support 3, to the top of a post 22, which is supported by the main supporting structure 2 so that it can slide along its own axis 23. The post 22 can move vertically, in a per se known manner, with respect to the main supporting structure 2 along its axis 23 so as to actuate the lifting or lowering of the annular support 3. The vertical movement of the post 22 with respect to the main supporting structure 2 can be provided, in a per se known manner, by means of an electric motor or by means of an actuator of another type, such as for example a fluid-operated cylinder, which is functionally connected to the control and actuation element 13.

The arm 21 and the post 22 are provided hollow, so as to provide as a whole a duct that is connected in a per se known manner to the delivery of a fan 24 that is supported by the main supporting structure 2 and can be actuated by means of a corresponding electric motor 25. This duct has, in a per se known manner, an outlet on the inner lateral surface of the annular support 3, not visible in the figures, from which the air flow generated by the actuation of the fan 24 is directed in the region which, during the operation of the apparatus, lies below the die 6 and/or the cutting accessory 7 in order to strike the pasta 15 being produced, drying it at least superficially.

Preferably, the electric motor 12 that actuates the main shaft 8 is arranged coaxially to the annular support 3. More particularly, the electric motor 12 is supported by means of spokes 26 that extend radially from the inner lateral surface of the annular support 3.

In the apparatus according to the disclosure, the support of the electric motor 12 by means of two or more spokes 26, differently from what occurs in apparatuses of the known type, in which the main shaft is connected to a 90° transmission and is supported by a single horizontal arm that is significantly larger than the spokes 26, one achieves the advantage of not hindering, or of hindering to a lesser extent, the descent of the pasta 15, avoiding an unwanted deformation thereof.

On the upper side of the spokes 26 it is possible to arrange light sources 27, for example of the LED type, which are preferably directed upward so as to illuminate the region located below the die 6 or the cutting accessory 7.

The cutting accessory 7 is provided with a body 28 that extends around an axis that can be arranged coaxially and below the die 6.

The cutting accessory 7 is provided with at least one blade, which is supported, so that it can rotate about its own axis, which coincides with the axis of the body 28 of the cutting accessory 7, by the body 28 of the cutting accessory 7.

The main shaft 8 can be coupled to the blade 10 of the cutting accessory 7 and to the body 28 of the cutting accessory 7 by way of unilateral rotational connection means 29 so as to actuate the rotation of the blade 10 with respect to the body 28 of the cutting accessory 7 as a consequence of the rotation of the main shaft 8 about its own axis 4 in one direction of rotation and to turn the blade 10 integrally with the body 28 of the cutting accessory 7 as a consequence of the rotation of the main shaft 8 about its own axis 4 in the opposite direction of rotation.

Figure 1:
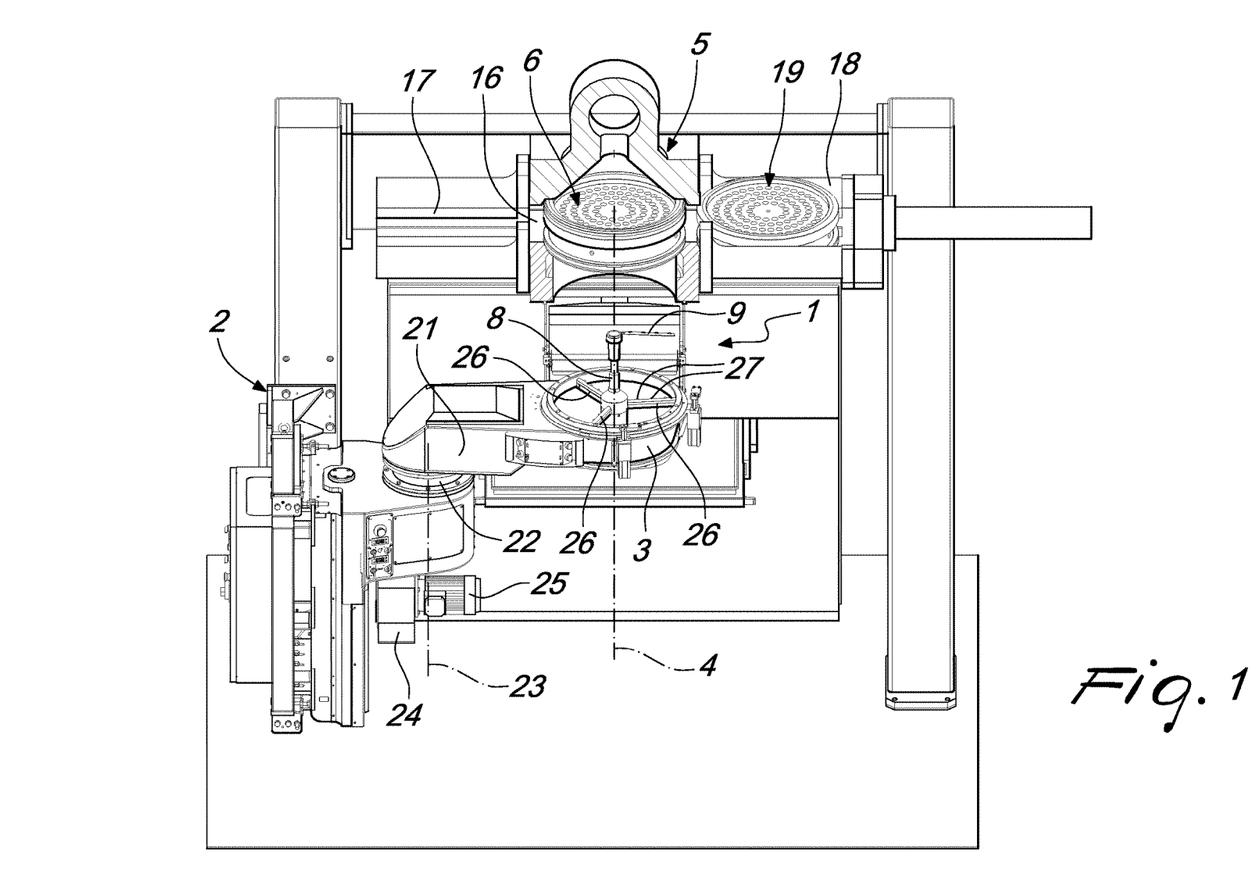
FIG. 1 is a schematic perspective view of the apparatus according to the disclosure, without a cutting accessory, arranged at the outlet of a press for making pasta, shown exclusively as regards the region occupied by the die.
Figure 2:
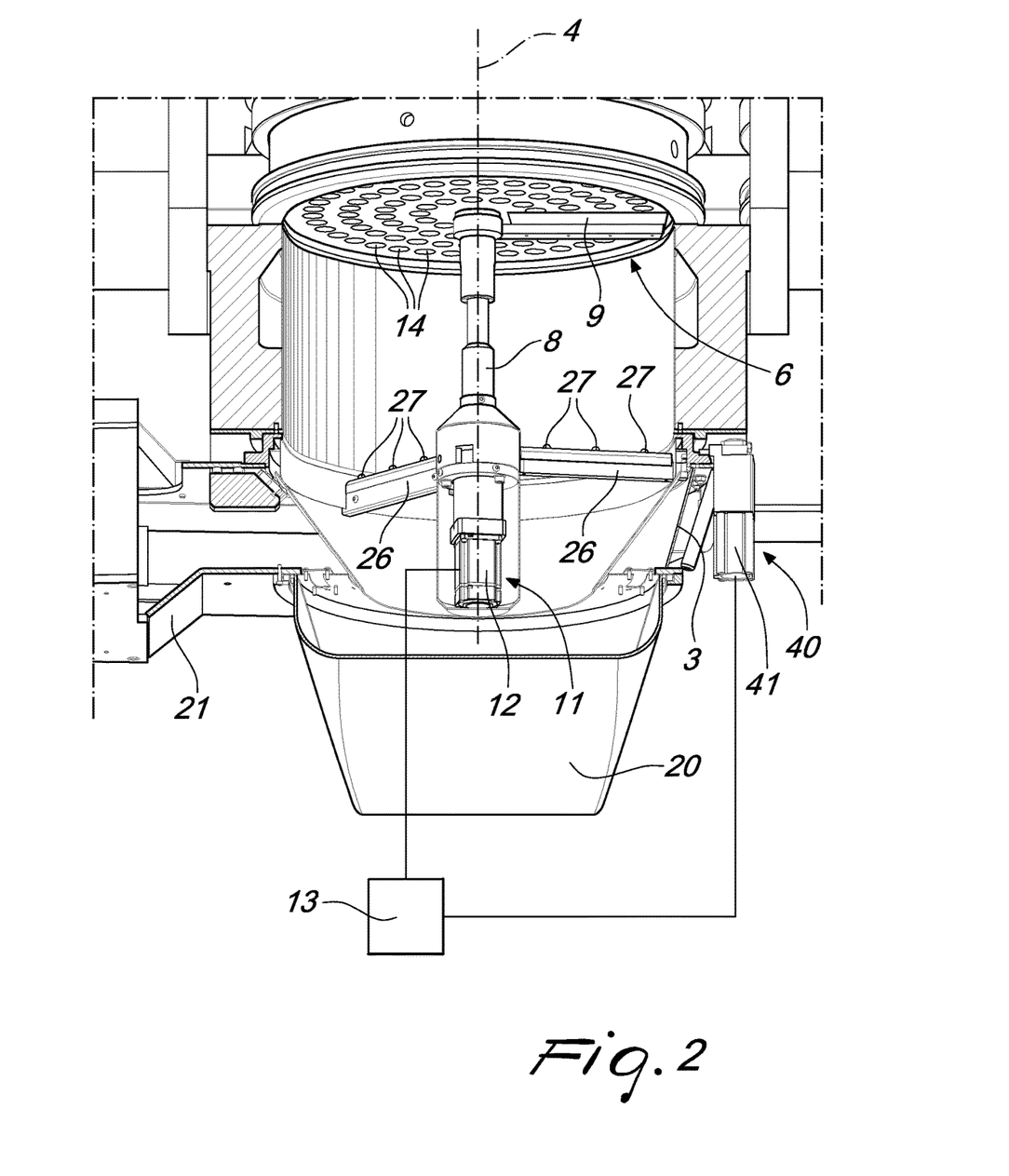
FIG. 2 is a partially sectional schematic perspective view of the apparatus according to the disclosure, with the blade placed in contact with the lower face of the die.
Figure 3:
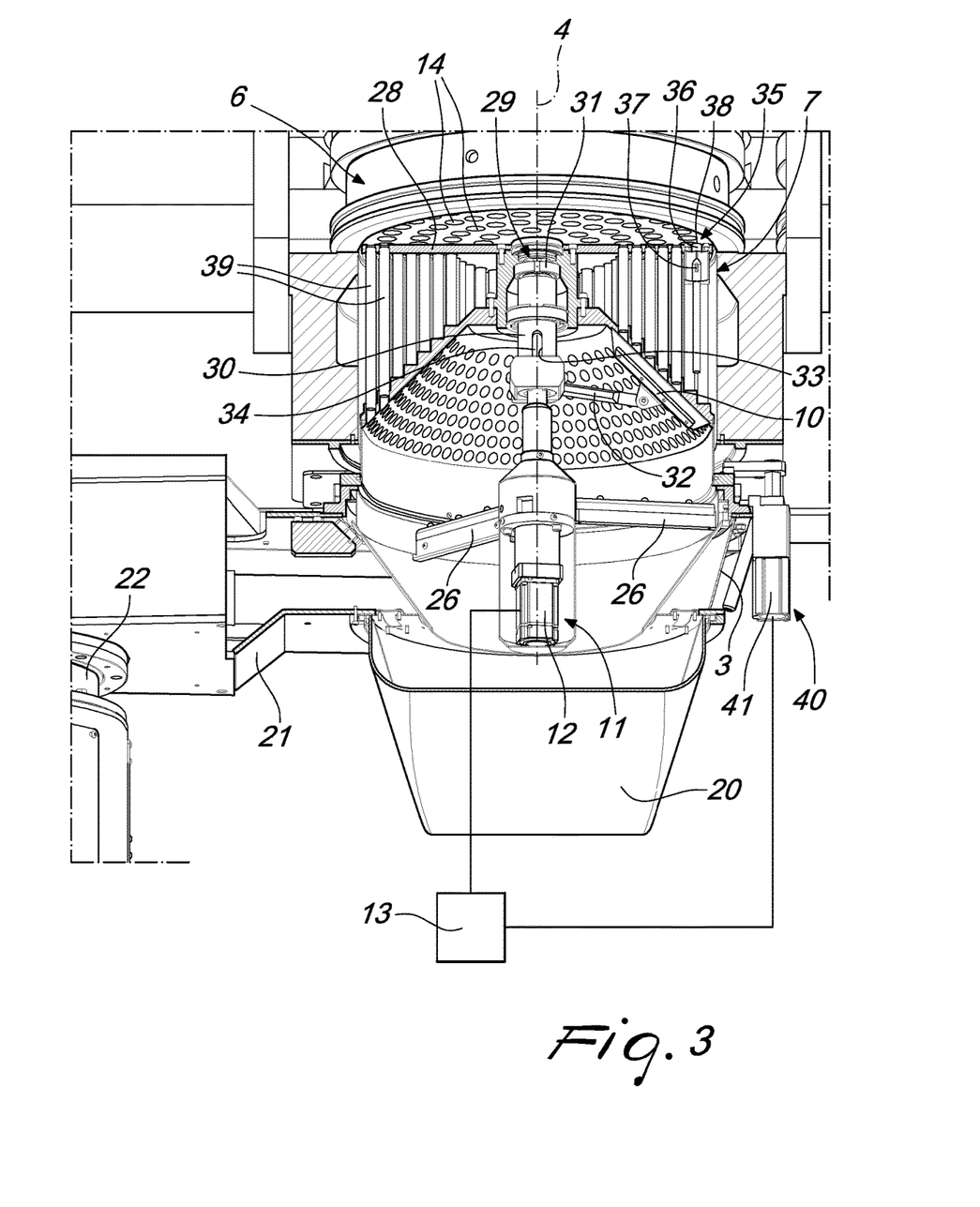
FIG. 3 is a schematic view, similar to FIG. 2, of the apparatus according to the disclosure with a cutting cone mounted thereon and placed in contact with the lower face of the die.
Figure 4:
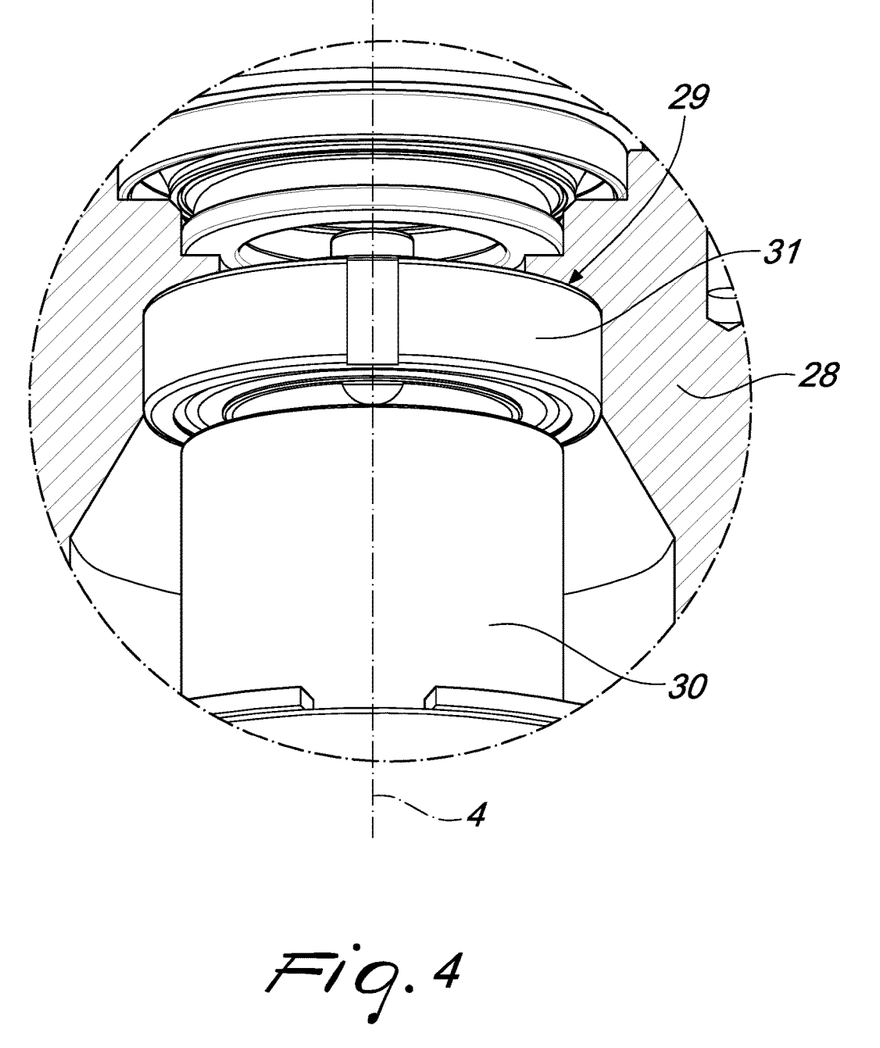
FIG. 4 is an enlarged-scale view of a detail of FIG. 3.

More particularly, as shown in particular in FIG. 4, the body 28 of the cutting accessory 7 supports a sleeve 30, which is arranged coaxially to the body 28 of the cutting accessory 7, by means of a freewheel mechanism 31 so that the sleeve 30 can rotate freely about its own axis with respect to the body 28 of the cutting accessory 7 in one direction of rotation and is integral, in rotation about its own axis, with the body 28 of the cutting accessory 7 when it is rotated in the opposite direction.

The sleeve 30, by means of a lateral arm 32, supports the blade 10 of the cutting accessory 7.

Inside the sleeve 30 there is a slot 33 in which a tab 34 supported by the main shaft 8 engages when such shaft is inserted coaxially within the sleeve 30, so that the main shaft 8 is integral in rotation about its own axis 4 with the sleeve 30.

Conveniently, on the body 28 of the cutting accessory 7 and on the die 6 there are centering means 35, which can be mutually coupled in a preset rotational position of the body 28 of the cutting accessory 7 about its own axis with respect to the die 6. The centering means 35 are adapted to cause an increase in the operating torque of the electric motor 12 upon their mutual coupling.

More particularly, the centering means 35 can be constituted simply by a spring-loaded pin 36, which is supported by the upper face of the body 28 of the cutting accessory 7 and is pushed so as to protrude from such face by way of the action of a spring 37, and by a seat 38 that is defined in the lower face of the die 6 so that when the pin 36 engages the seat 38 the holes that pass through the body of the cutting accessory 7 are aligned with the holes 14 of the die 6.

In the illustrated embodiment, the cutting accessory 7 is constituted by a cutting cone, the body 28 of which has a cylindrical lateral surface, a substantially flat upper base which can be coupled to the lower face of the die 6, and a concave and conical lower face on which the blade 10 acts. The upper face and the lower face of the body 28 of the cutting accessory 7 are crossed by a plurality of holes that correspond with the holes 14 of the die 6. The holes of the upper base and the holes of the lower base of the body 28 of the cutting accessory 7 are mutually connected by tubes 39 that are oriented so as to be parallel to the axis of the body 28 of the cutting accessory 7 and are intended to be crossed by the strands of pasta that exit from the holes 14 of the die 6. The apparatus according to the disclosure is provided further with means 40 for locking the body 28 of the cutting accessory 7 with respect to the annular support 3.

The locking means 40 can be constituted by fluid-operated cylinders 41, which are supported by the annular support 3 and can engage the body 28 of the cutting accessory 7. The locking means 40 are further provided with sensors of a known type, which are connected functionally to the control and actuation element 13 so as to report to this element that the body 28 of the cutting accessory 7 has been locked with respect to the annular support 3.

Operation of the apparatus according to an disclosure is described hereinafter during the mounting of a cutting accessory 7 constituted by a cutting cone, it being understood that the operating sequence that is described also applies for the mounting of other cutting accessories, such as for example the cutting accessories known as straight cutters.

When one wishes to mount a cutting cone 7 on the apparatus, the annular support 3 is lowered below the die 6 and the cutting cone 7 is arranged thereon, inserting the main shaft 8 within the sleeve 30 so that they are mutually integral in rotation about the common axis 4. In this condition, the die 6, the main shaft 8 and the body 28 of the cutting cone 7 are mutually coaxial. The annular support 3 is then lifted, performing the vertical translation of the post 22, in a per se known manner, until the upper face of the body 28 of the cutting cone 7 rests against the lower face of the die 6. This resting causes the at least partial retraction of the pin 36 within the body 28 of the cutting cone 7, loading the spring 37. At this point, the control and actuation element 13 actuates the electric motor 12 so that it causes the rotation of the main shaft 8 and of the sleeve 30 in the direction of rotation along which the sleeve 30 rotates integrally with the body 28 of the cutting cone 7. This direction of rotation is opposite with respect to the direction of rotation of the sleeve 30 during the normal use of the apparatus or during the cutting of the pasta 15.

Due to this rotation, the body 28 of the cutting cone 7 rotates about its own axis with respect to the die 6 until the pin 36 arrives at the seat 38 provided in the lower face of the die 6, thus centering the body 28 of the cutting cone 7 with respect to the die 6. The engagement of the pin 36 within this seat 38 by way of the action of the spring 37 contrasts the rotation of the body 28 of the cutting cone 7, causing an increase in the operating torque of the electric motor 12 that is detected by the control and actuation element 13, which stops the electric motor 12.

Subsequently, the actuation and control element 13 actuates the fluid-operated cylinders 41, which block the body 28 of the cutting cone 7 with respect to the annular support 3. The sensors with which the fluid-operated cylinders 41 are equipped report that the cutting cone 7 has been locked to the control and actuation element 13, which actuates the electric motor 12 along a direction of rotation that is opposite with respect to the preceding one, i.e., along the normal direction of rotation. In this direction of rotation, the sleeve 30 rotates freely about its own axis with respect to the body 28 of the cutting cone 7, turning the blade 10 with respect to the body 28 of the cutting cone 7.

Figure 5:
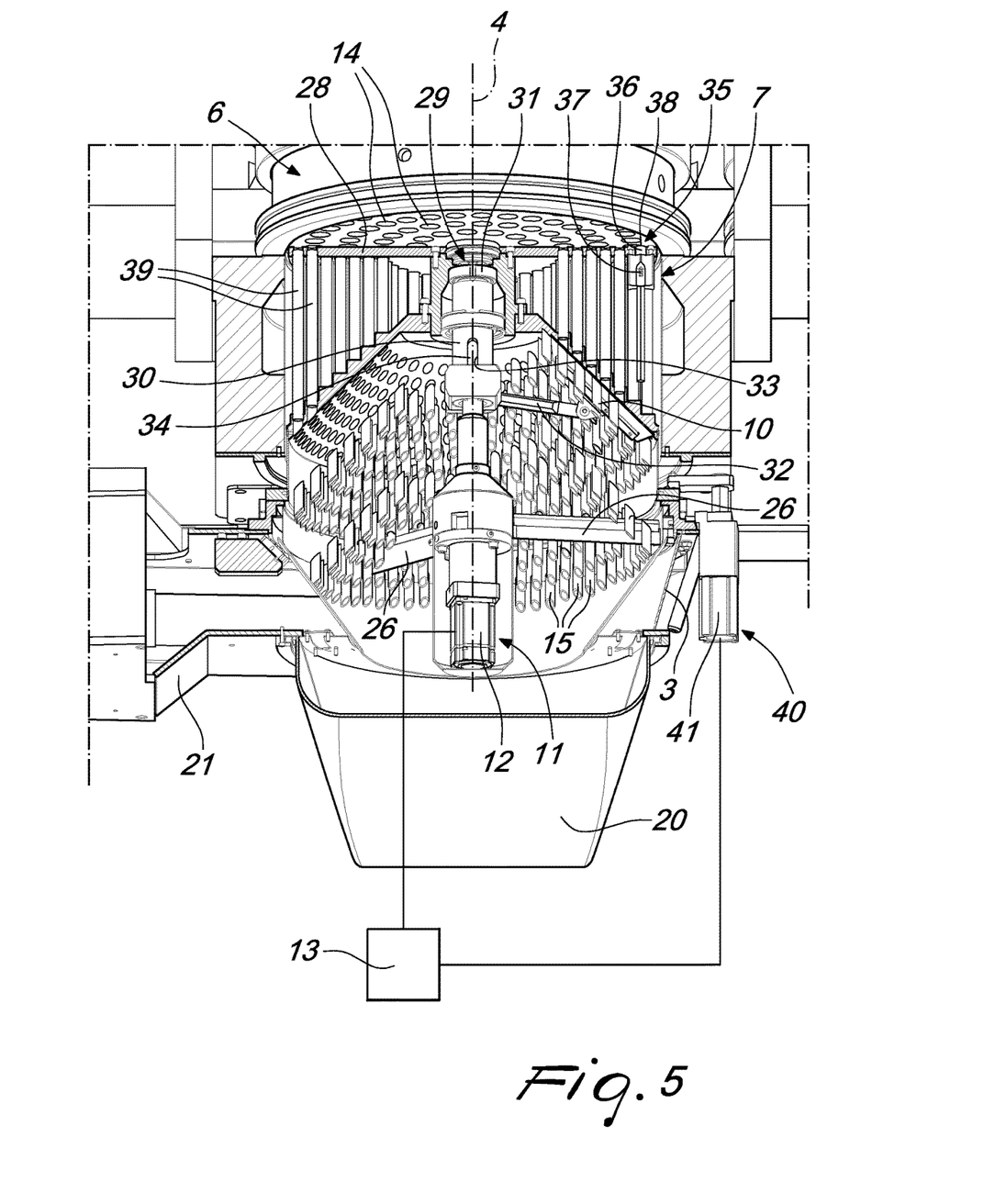
FIG. 5 is a schematic view, similar to FIG. 3, of the apparatus according to the disclosure at the beginning of pasta making.

At this point it is possible to begin the extrusion of the pasta 15, which passes through the die 6, is channeled into the tubes 39, exits from the lower face of the cutting cone 7, and is cut by the rotating blade 10, as shown in FIG. 5.

Figure 6:
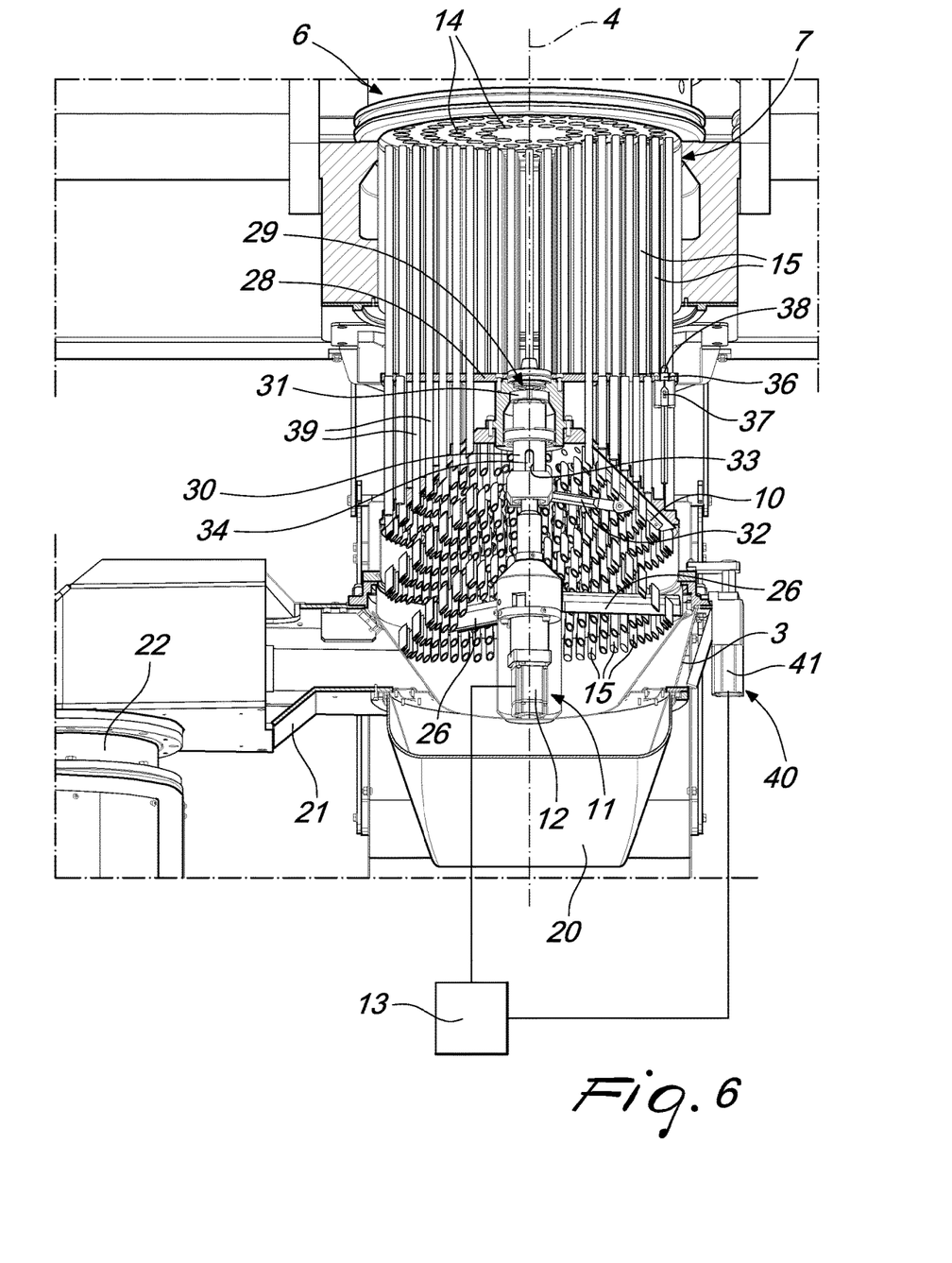
FIG. 6 is a view, similar to FIG. 5, of the apparatus according to the disclosure during pasta making, with the cutting cone spaced downward from the die.

After the pasta 15 has been channeled correctly into the tubes 39, the annular support 3 can be lowered so as to space the cutting cone 7 below the die 6, as shown in FIG. 6. This spacing, already used also in apparatuses of the known type, achieves the at least partial surface drying of the pasta 15 before it enters the cutting cone 7, so as to avoid deformation of the pasta 15 during cutting.

It should be noted that the various operations described above, including the lifting and lowering of the annular support 3, can be actuated by the control and actuation element 13 by following a preset actuation program.

As can be noted, with the apparatus according to the disclosure it is possible to mount a cutting accessory 7 and start the cutting operation in a fully automated manner, reducing considerably the time required for this operation.

It should be noted that control of the operating torque of the electric motor 12 that drives the main shaft 8 can be used not only to perform the automated mounting of a cutting accessory 7 but also to stop it if a maximum operating torque preset in the control and actuation element 13 is reached, so as to increase the reliability and safety of the cutting operations.

In fact, if drawbacks occur during the extrusion process which cause an abnormal braking of the blade 9, thus increasing the operating torque of the electric motor 12, the actuation and control element 13 stops the electric motor 12 immediately, avoiding possible damage to the die 6. For example, if, during the extrusion process, one of the extrusion inserts of the die 6 were to move downward, protruding from the lower face of the die 6 until it interferes with the blade 9, the operating torque of the electric motor 12 would increase, causing it to stop as a consequence of the intervention of the control and actuation element 13. This prevents damage to the cutting element of the blade 9, caused by the impact against the extrusion insert that has descended, from being able to cause damage to the other extrusion inserts of the die 6 that are arranged along the same circumference as the one that caused damage to the cutting element blade 9.

In this manner it is possible to intervene to replace the damaged insert and cutting element, avoiding more onerous repair interventions.

In practice it has been found that the apparatus according to the disclosure achieves fully the intended aim, since it allows to mount cutting accessories in a completely automated manner, thus reducing the downtimes of the production line and thus reducing the extent of the losses due to lack of production.

Another advantage of the apparatus according to the disclosure is that it reduces manual interventions in the mounting of the cutting accessories and therefore reduces the risk of accidents to personnel during this operation.

A further advantage of the apparatus according to the disclosure is that it reduces the damage caused by abnormal operation of the blade or blades.

The apparatus thus conceived is susceptible of numerous modifications and variations; all the details may further be replaced with other technically equivalent elements.

In practice, the materials used, so long as they are compatible with the specific use, as well as the dimensions, may be any according to requirements and to the state of the art.

What is claimed is:

1. An automatic cutting apparatus, applicable to presses for making pasta or to extruders for making snacks, comprising:
   a main supporting structure;
   an annular support having a vertical axis, which is associated with a press for making pasta or with an extruder for making snacks below a die that has a vertical axis and is connected to the outlet of the press or of the extruder, or below a cutting accessory that is interposed between the die and said annular support;
   a main shaft that is arranged coaxially to said annular support and is coupled to at least one blade that is adapted to act on the lower face of the die or with at least one blade of said cutting accessory;
   actuation means configured for actuating said main shaft with a rotary motion about its own axis;
   said actuation means comprising an electric motor;
   wherein said actuation means comprise:
   a control and actuation element;
   detector means configured for detecting the operating torque of said electric motor, which are functionally connected to said control and actuation element for the actuation at least of said electric motor as a function of the operating torque detected by said detector means, wherein said annular support is supported by the end of an arm that is arranged substantially horizontally and is supported by said main supporting structure;
   said acutation and control element being functionally connected to said arm in order to actuate its movement at least along a vertical direction.

2. The apparatus according to claim 1, wherein said control and actuation element are adapted to interrupt and/or vary the actuation of said electric motor upon reaching an operating torque that is preset in said control and actuation element.

3. The apparatus according to claim 1, wherein said electric motor is constituted by a brushless electric motor.

4. The apparatus according to claim 1, wherein said cutting accessory comprises a body that is extended around an axis and is arranged coaxially below the die; said main shaft being associable with the at least one blade of said cutting accessory and with said body of the cutting accessory by way of unilateral rotational connection means for the rotation of said at least one blade with respect to the body of said cutting accessory following the rotation of said main shaft about its own axis in one direction of rotation and for the rotation of said at least one blade integrally with the body of said cutting accessory due to the rotation of said main shaft about its own axis in the opposite direction of rotation.

5. The apparatus according to claim 4, wherein said main shaft is inserted coaxially in a sleeve that supports said at least one blade and is connected, in rotation about its own axis, to said body of the cutting accessory by means of a freewheel mechanism that is adapted to render said sleeve integral with said body of the cutting accessory in rotation about its own axis in one direction of rotation and freely rotatable with respect to said body of the cutting accessory in rotation about its own axis in the opposite direction of rotation.

6. The apparatus according to claim 4, further including centering means disposed on said cutting accessory and on the die and are mutually coupled in a preset rotational position of said body of the cutting accessory about its own axis with respect to the die; said centering means being adapted to cause an increase in the operating torque of said electric motor upon the mutual coupling of said centering means.

7. The apparatus according to claim 4, wherein said centering means comprise at least one elastic pin that protrudes from the face of the body of said cutting accessory to be directed toward the die and are coupled to a seat that is provided correspondingly in the lower face of the die.

8. The apparatus according to claim 1, wherein said electric motor is arranged coaxially to said annular support.

9. The apparatus according to claim 1, wherein said electric motor is supported by a plurality of spokes that extend radially from an internal lateral surface of said annular support.

10. The apparatus according to claim 9, wherein said spokes support light sources that are directed upward.

11. The apparatus according to claim 1, wherein said cutting accessory comprises a cutting cone that has a body of the cutting accessory with a cylindrical lateral surface, a substantially flat upper base that is coupled to the lower face of the die, a concave and conical lower face, said upper face and said lower face of the body of the cutting accessory being crossed by a plurality of holes that are aligned with each other and are aligned with the holes of the die; the holes of the upper base and the holes of the lower base of the body of the cutting accessory being mutually connected by tubes that are oriented parallel to the axis of the body of the cutting accessory.

12. The apparatus according to claim 4, further comprising locking means configured for securing the body of the cutting accessory with respect to said annular support, said locking means being connected to said control and actuation element.

13. An automatic cutting apparats, applicable to presses for making pasta or to extruders for making snacks, comprising:
a main supporting structure;
an annular support having a vertical axis, which is associated with a press for making pasta or with an extruder for making snacks below a die that has a vertical axis and is connected to the outlet of the press or of the extruder, or below a cutting accessory that is interposed between the die and said annular support;
a main shaft that is arranged coaxially to said annular support and is coupled to at least one blade that is adapted to act on the lower face of the die or with at least one blade of said cutting accessory;
means for actuating said main shaft with a rotary motion about its own axis;
said actuation means comprising an electric motor;
wherein said actuation means comprise:
a control and actuation element of the electronic type;
means for detecting the operating torque of said electric motor, which are functionally connected to said control and actuation element for the actuation at least of said electric motor as a function of the operating torque detected by said detector means, wherein said cutting accessory comprises a body that is extended around an axis and is arranged coaxially below the die; said main shaft being associable with the at least one blade of said cutting accessory and with said body of the cutting accessory by way of unilateral rotational connection means for the rotation of said at least one blade with respect to the body of said cutting accessory following the rotation of said main shaft about its own axis in one direction of rotation and for the rotation of said at least one blade integrally with the body of said cutting accessory due to the rotation of said main shaft about its own axis in the opposite direction of rotation.

14. An automatic cutting apparatus, applicable to presses for making pasta or to extruders for making snacks, comprising:
a main supporting structure;
an annular support having a vertical axis, which is associated with a press for making pasta or with an extruder for making snacks below a die that has a vertical axis and is connected to the outlet of the press or of the extruder, or below a cutting accessory that is interposed between the die and said annular support;
a main shaft that is arranged coaxially to said annular support and is coupled to at least one blade that is adapted to act on the lower face of the die or with at least one blade of said cutting accessory;
means for actuating said main shaft with a rotary motion about its own axis;
said actuation means comprising an electric motor;
wherein said actuation means comprise:
a control and actuation element of the electronic type;
means for detecting the operating torque of said electric motor, which are functionally connected to said control and actuation element for the actuation at least of said electric motor as a function of the operating torque detected by said detector means, wherein said electric motor is supported by spokes that extend radially from the internal lateral surface of said annular support.

15. An automatic cutting apparatus, applicable to presses for making pasta or to extruders for making snacks, comprising:
a main supporting structure;
an annular support having a vertical axis, which is associated with a press for making pasta or with an extruder for making snacks below a die that has a vertical axis and is connected to the outlet of the press or of the extruder, or below a cutting accessory that is interposed between the die and said annular support;
a main shaft that is arranged coaxially to said annular support and is coupled to at least one blade that is adapted to act on the lower face of the die or with at least one blade of said cutting accessory;
means for actuating said main shaft with a rotary motion about its own axis;
said actuation means comprising an electric motor;
wherein said actuation means comprise:
a control and actuation element of the electronic type;
means for detecting the operating torque of said electric motor, which are functionally connected to said control and actuation element for the actuation at least of said electric motor as a function of the operating torque detected by said detector means, wherein said cutting accessory comprises a cutting cone that has a body of the cutting accessory with a cylindrical lateral surface, a substantially flat upper base that is coupled to the lower face of the die, a concave and conical lower face, said upper face and said lower face of the body of the cutting accessory being crossed by a plurality of holes that are aligned with each other and are aligned with the holes of the die; the holes of the upper base and the holes of the lower base of a body of the cutting accessory being mutually connected by tubes that are oriented parallel to the axis of the body of the cutting accessory.

* * * * *